3,210,396
HYDRAZINE DERIVATIVES AND THEIR
PREPARATION
David Horvitz, Cincinnati, Ohio, assignor, by mesne assignments, to FMC Corporation, New York, N.Y., a corporation of Delaware
No Drawing. Filed Nov. 20, 1958, Ser. No. 775,124
5 Claims. (Cl. 260—458)

This application is a continuation-in-part of copending application, Serial No. 608,652, filed September 5, 1956, and now abandoned, entitled "Hydrazine Derivatives and Their Preparation."

This invention relates to novel derivatives of hydrazine and their preparation and, more specifically, to ethylenehydrazine and certain intermediate products in the manufacture thereof.

Ethylenehydrazine, which may also be termed N-aminoethylenimine, has the structural formula

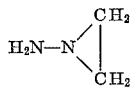

and is useful as a jet propulsion fuel or as an additive, igniter, or starter for such fuels. It contains a 3-membered ring and an N—N bond, both of which are sources of considerable energy. In addition, it has favorable properties with respect to hypergolicity, freezing point, and other physical properties. Ethylenehydrazine, depending on its state of purity, boils between 88 and 92° C. It is a liquid subject to oxidation by air and is, therefore, preferably kept out of contact with air. It is sufficiently stable such that it can be distilled at atmospheric pressure without appreciable decomposition but polymerizes in presence of acid and undergoes chemical change in presence of alkali.

A suitable method for preparation of ethylenehydrazine comprises subjecting beta-hydrazinoethylsulfate to an elevated temperature, such as 80° C. to 150° C., with a suitable alkaline agent, such as alkali or alkaline earth oxides or hydroxides, and preferably under temperature conditions to distill the product as it is formed. In a specific embodiment, beta- hydrazinoethylsulfate is dissolved in a sodium hydroxide solution and the resulting solution added gradually to a suitable vessel heated to a temperature sufficient to distill the product during addition to the vessel of the aforesaid solution. The desired ethylene-hydrazine product may be separated from the distillate by any of several suitable methods including solvent extraction (e.g., petroleum ether); addition of a suitable substance such as anhydrous hydrazine to the distillate and fractionally distilling to recover the ethylenehydrazine; or adding anhydrous hydrazine to the distillate, extracting with ethyl ether and removing the ether by distillation.

In order to further describe the invention, the following embodiments are set forth for purposes of illustration but not limitation.

*Example 1*

Hydroxyethyl hydrazine is prepared in the known manner by reacting ethylene oxide with an excess of hydrazine.

To one part of beta-hydroxyethylhydrazine diluted with one part of water, an aqueous solution of 50% sulfuric acid by weight is added until a pH of about 5 is reached. An equal amount of sulfuric acid is then additionally added. The resulting mixture is heated in a flask equipped with a condenser and receiver under a reduced pressure of about 15 mm. Hg to a temperature not exceeding 80° C. (to avoid sulfate ester formation at this stage) until the evolution of water ceases. The crystalline residue is then dissolved in boiling methanol, filtered while hot, and allowed to cool to separate fine, white crystals of beta-hydroxyethylhydrazinium sulfate of the following structure which melt at 86.5° C.

The crystals of hydroxyethylhydrazinium sulfate are placed in a flask which is heated in an oil bath to a maximum temperature of 110° C. under a pressure of about 1 mm. Hg. Pure dry nitrogen is bubbled through the contents of the flask and heating is continued until the evolution of water has ceased or becomes very slow. The first portions of the water are evolved rapidly but the final 30% is given off more slowly. If at least 88% of the theoretical amount of water has been evolved, the residue in the flask will crystallize on cooling to a white to pale yellow solid, otherwise a viscous liquid will result. The crude crystals which separate on cooling the residue in the flask are beta-hydrazinoethylsulfate

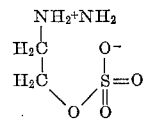

which is purified by dissolving the crude crystals in a small amount of water and precipitating the substantially pure compound by addition of methanol. The substantially pure product is a white solid having a melting point of 120–121° C.

One part of the beta-hydrazinoethylsulfate is dissolved cautiously in 2.8 parts of 40% sodium hydroxide solution. This mixture is then added dropwise to a flask equipped with a condenser and is so heated as to keep the product continuously distilling out during the addition. The distillate after cooling is treated with solid sodium hydroxide until an upper layer has completely separated. The upper layer containing the crude ethylenehydrazine is purified by dissolving it in an equal amount of water and extracting impurities with petroleum ether while the ethylenehydrazine remains in the aqueous portion. The ethylenehydrazine is then recovered from the aqueous solution by careful treatment with a dehydrating agent, such as barium oxide, the temperature not being permitted to rise above 25–30° C. The dry product is finally purified by distillation. Elemental analysis of ethylenehydrazine perpared as aforedescribed gave the following values:

|  | Found | Theory |
| --- | --- | --- |
| Molar ratio of nitrogen: carbon | 1.036 | 1.0 |
| Molar ratio of hydrogen: nitrogen | 3.152 | 3.0 |

Ethylenehydrazine is a colorless liquid which boils at 92° C., melt at −40.5° C. and has a density of 0.9714 gm./ml. at 24° C.

*Example 2*

This run was made under the same conditions as those of Example 1 except that the ethylenehydrazine contained in the crude oil obtained from the reaction distillate was purified by adding thereto approximately an equal amount of anyhdrous hydrazine and then fractionally distilling under reduced pressure (75 mm. Hg).

*Example 3*

This run was made under the same conditions as Example 1 with the exception that the ethylenehydrazine contained in the crude oil obtained from the reaction distillate was purified by the addition thereto of an approximately equal amount of anhydrous hydrazine, extraction with ethyl ether and removal of the ether by distillation.

Also embodied herein as new compounds are beta-hydrazinoethylsulfate which can be prepared by thermal dehydration of beta-hydroxyethylhydraziniumsulfate as afore-described as well as the beta1-hydroxyethylhydraziniumsulfate which can be prepared by reacting beta-hydroxyethylhydrazine with a substantially equivalent amount of sulfuric acid in aqueous solution, as is also described in the specific embodiment set forth hereinbefore.

The novel compound, ethylenehydrazine, can be used as a rocket propellant by itself without the use of an oxidizer. As aforesaid, considerable energy is contained in the highly strained 3-membered ring and in the N—N bond a great amount of heat (approximately 50 kcals./mole) is evolved when it decomposes to the elements. Accordingly, it may be used by itself as a monopropellant. The novel compound is most conveniently and usefully employed in its liquid form and, in a rocket engine, ignition may be initiated either by use of a catalyst or by heating.

Ethylenehydrazine is extremely hypergolic with white fuming nitric acid and with red fuming nitric acid. As an illustration of its hypergolicity, instantaneous ignition occurs on addition of the first drop when ethylenehydrazine is dropped, a drop at a time, into 0.5 cc. of nitric acid. It should be understood, however, that ethylenehydrazine is a superior fuel aside from its hypergolic properties, the latter being of added value. When ethylenehydrazine is used as a fuel together with an oxidizer, the ethylenehydrazine and the oxidizer (both in the form of liquids) are separately injected into the combustion chamber of a rocket engine in such a way that intimate mixing of the liquids occurs immediately. For example, in the use of nitric acid as the oxidizer, ignition takes place spontaneously on admixture of the two liquids.

Ethylenehydrazine is also useful as an igniter or starter for non-hypergolic fuels, such as gasoline. Thus, when gasoline and nitric acid are the main fuel-oxidizer system, a small quantity of ethylenehydrazine can be fed into the fuel feed line just ahead of the gasoline. When the propellant flows are started, the ethylene hydrazine comes out first, and on contact with nitric acid initiates ignition; and when the gasoline begins to enter the chamber it is ignited by the flame already in the chamber.

Ethylenehydrazine may also be used as an igniter or starter by dissolving it in a non-hypergolic fuel in sufficient quantity to provide a combination that is hypergolic. Thus, by dissolving approximately 30% by weight of ethylene hydrazine in benzene (which is itself not hypergolic with nitric acid), the resulting solution is hypergolic with nitric acid. In still other applications, ethylenehydrazine may be admixed with methylhydrazine or unsdimethylhydrazine in amounts of about 5 to 50% to increase the sensitivity of those fuels to catalytic or thermal ignition when they are used as monopropellants. Additionally, ethylenehydrazine can be added to hydrazine to increase hypergolicity of the latter at low temperatures; furthermore, ethylenehydrazine may be added to conventional fuels, such as alcohols, to improve their performance, and in which case the ethylenehydrazine should generally be added in an amount of at least 30% by weight to obtain a significant increase in performance.

The foregoing description is for the purpose of illustration and not of limitation, and it is therefore our intention that the invention be limited only by the appended claims or their equivalent.

What is claimed is:
1. Beta-hydrazinoethylsulfate.
2. A process for preparation of beta-hydrazinoethylsulfate which comprises subjecting hydroxyethylhydrazinium sulfate to an elevated temperature up to about 110° C. under reduced pressure until evolution of water substantially ceases.
3. A process, as defined in claim 2, wherein the hydroxyethylhydrazinium sulfate is subjected to the elevated temperature until at least about 88% of the theoretical amount of water has been evolved.
4. Beta-hydroxyethylhydrazinium sulfate.
5. A process for preparation of beta-hydroxyethylhydrazinium sulfate which comprises heating, to an elevated temperature up to about 80° C. and at reduced pressure, an aqueous reaction mixture of beta-hydroxyethylhydrazine and sulfuric acid until evolution of water from said mixture substantially ceases.

References Cited by the Examiner

FOREIGN PATENTS 1,040,000  10/53  France.

OTHER REFERENCES

Wenker: J. Am. Chem. Soc., volume 57, page 2328 (1935).

NICHOLAS S. RIZZO, *Primary Examiner.*

HERBERT J. LIDOFF, L. D. ROSDOL, WILLIAM F. WILES, IRVING MARCUS, WALTER A. MODANCE, *Examiners.*